(12) United States Patent
Leather

(10) Patent No.: US 7,920,141 B2
(45) Date of Patent: *Apr. 5, 2011

(54) METHOD AND APPARATUS FOR RASTERIZER INTERPOLATION

(75) Inventor: Mark M. Leather, Saratoga, CA (US)

(73) Assignee: ATI Technologies ULC, Markham, Ontario (CA)

( * ) Notice: Subject to any disclaimer, the term of this patent is extended or adjusted under 35 U.S.C. 154(b) by 320 days.

This patent is subject to a terminal disclaimer.

(21) Appl. No.: 11/364,037

(22) Filed: Feb. 28, 2006

(65) Prior Publication Data

US 2006/0170690 A1 Aug. 3, 2006

Related U.S. Application Data

(63) Continuation of application No. 10/730,864, filed on Dec. 8, 2003, now Pat. No. 7,061,495, which is a continuation of application No. 10/716,590, filed on Nov. 18, 2003, now abandoned.

(60) Provisional application No. 60/427,260, filed on Nov. 18, 2002.

(51) Int. Cl.
*G06T 11/20* (2006.01)
*G06F 15/80* (2006.01)
*G06F 17/00* (2006.01)
*G09G 5/00* (2006.01)

(52) U.S. Cl. ........ 345/441; 345/611; 345/612; 345/418; 345/505

(58) Field of Classification Search .................. 345/611, 345/441, 612, 418
See application file for complete search history.

(56) References Cited

U.S. PATENT DOCUMENTS

| | | | |
|---|---|---|---|
| 4,885,703 A | 12/1989 | Deering | |
| 5,179,640 A | 1/1993 | Duffy | |
| 5,550,962 A | 8/1996 | Nakamura et al. | |
| 5,745,118 A | 4/1998 | Alcorn et al. | |
| 5,794,016 A | 8/1998 | Kelleher | |
| 5,818,469 A | 10/1998 | Lawless et al. | |
| 5,905,506 A | 5/1999 | Hamburg | |
| 5,977,997 A | 11/1999 | Vainsencher | |
| 5,999,196 A | 12/1999 | Storm et al. | |
| 6,118,452 A | 9/2000 | Gannett | |

(Continued)

OTHER PUBLICATIONS

Breternitz, Jr., Mauricio et al.; "Compilation, Architectural Support, and Evaluation of SIMD Graphics Pipeline Programs on a General-Purpose CPU"; IEEE; 2003; pp. 1-11.

(Continued)

*Primary Examiner* — Hau H Nguyen
(74) *Attorney, Agent, or Firm* — Vedder Price P.C.

(57) ABSTRACT

The present invention relates to a rasterizer interpolator. In one embodiment, a setup unit is used to distribute graphics primitive instructions to multiple parallel rasterizers. To increase efficiency, the setup unit calculates the polygon data and checks it against one or more tiles prior to distribution. An output screen is divided into a number of regions, with a number of assignment configurations possible for various number of rasterizer pipelines. For instance, the screen is sub-divided into four regions and one of four rasterizers is granted ownership of one quarter of the screen. To reduce time spent on processing empty times, a problem in prior art implementations, the present invention reduces empty tiles by the process of coarse grain tiling. This process occurs by a series of iterations performed in parallel. Each region undergoes an iterative calculation/tiling process where coverage of the primitive is deduced at a successively more detailed level.

43 Claims, 8 Drawing Sheets

U.S. PATENT DOCUMENTS

| | | |
|---|---|---|
| 6,184,906 B1 | 2/2001 | Wang et al. |
| 6,219,062 B1 | 4/2001 | Matsuo et al. |
| 6,222,550 B1 | 4/2001 | Rosman et al. |
| 6,292,200 B1 | 9/2001 | Bowen et al. |
| 6,323,860 B1 * | 11/2001 | Zhu et al. ............... 345/427 |
| 6,344,852 B1 | 2/2002 | Zhu et al. |
| 6,353,439 B1 | 3/2002 | Lindholm et al. |
| 6,380,935 B1 | 4/2002 | Heeschen et al. |
| 6,384,824 B1 | 5/2002 | Morgan et al. |
| 6,407,736 B1 | 6/2002 | Regan |
| 6,417,858 B1 | 7/2002 | Bosch et al. |
| 6,424,345 B1 | 7/2002 | Smith et al. |
| 6,557,083 B1 | 4/2003 | Sperber et al. |
| 6,570,579 B1 | 5/2003 | MacInnis et al. |
| 6,573,893 B1 | 6/2003 | Naqvi et al. |
| 6,636,232 B2 * | 10/2003 | Larson ................... 345/611 |
| 6,650,327 B1 | 11/2003 | Airey et al. |
| 6,650,330 B2 | 11/2003 | Lindholm et al. |
| 6,697,063 B1 | 2/2004 | Zhu |
| 6,714,203 B1 | 3/2004 | Morgan et al. |
| 6,724,394 B1 | 4/2004 | Zatz et al. |
| 6,731,289 B1 | 5/2004 | Peercy et al. |
| 6,750,867 B1 * | 6/2004 | Gibson ................... 345/501 |
| 6,753,878 B1 | 6/2004 | Heirich et al. |
| 6,762,763 B1 | 7/2004 | Migdal et al. |
| 6,778,177 B1 | 8/2004 | Furtner |
| 6,791,559 B2 | 9/2004 | Baldwin |
| 6,801,203 B1 | 10/2004 | Hussain |
| 6,809,732 B2 | 10/2004 | Zatz et al. |
| 6,864,893 B2 | 3/2005 | Zatz |
| 6,864,896 B2 | 3/2005 | Perego |
| 6,897,871 B1 | 5/2005 | Morein et al. |
| 6,980,209 B1 | 12/2005 | Donham et al. |
| 7,015,913 B1 | 3/2006 | Lindholm et al. |
| 7,061,495 B1 | 6/2006 | Leather |
| 7,170,515 B1 | 1/2007 | Zhu |
| 2002/0145612 A1 | 10/2002 | Blythe et al. |
| 2003/0076320 A1 | 4/2003 | Collodi |
| 2003/0164830 A1 | 9/2003 | Kent |
| 2004/0041814 A1 | 3/2004 | Wyatt et al. |
| 2004/0100471 A1 | 5/2004 | Leather et al. |
| 2004/0164987 A1 | 8/2004 | Aronson et al. |
| 2005/0068325 A1 | 3/2005 | Lefebvre et al. |
| 2005/0200629 A1 | 9/2005 | Morein et al. |

OTHER PUBLICATIONS

International Search Report and Written Opinion for PCT Patent Application No. PCT/IB2004/003821; dated Mar. 22, 2005, 15 pp.

European Search Report for European Application No. 03257464.2; dated Apr. 4, 2006, 4 pp.

Foley, James et al.; "Computer Graphics, Principles and Practice"; Addison-Wesley Publishing Company; 1990; pp. 873-899.

Crockett, Thomas W.; "An Introduction to Parallel Rendering"; Elsevier Science B.V.; 1997; pp. 819-843.

Montrym, John S. et al.; "InfiniteReality: A Real-Time Graphics System"; Silicon Graphics Computer Systems; 1997; pp. 293-302.

Humphreys, Greg et al.; "WireGL: A Scalable Graphics System for Clusters"; ACM Siggraph; 2001; pp. 129-140.

Akeley K. et al., "High-Performance Polygon Rendering"; ACM Computer Graphics, vol. 22, No. 4; 1988; pp. 239-246.

Fuchs, Henry et al., "Pixel-Planes 5: A Heterogeneous Multiprocessor Graphics System Using Processor-Enhanced Memories"; Computer Graphics, vol. 23, No. 3, Jul. 1989; pp. 79-88.

* cited by examiner

4 Pipe Config 0

4 Pipe Config 1

2 Pipe Config 0

2 Pipe Config 1

1 Pipe Config 0

METHOD AND APPARATUS FOR RASTERIZER INTERPOLATION

This application is a continuation application of U.S. Application Ser. No. 10/730,864 filed Dec. 8, 2003, now U.S. Pat. No. 7,061,495, which is a continuation application of U.S. application Ser. No. 10/716,590 filed Nov. 18, 2003, now abandoned, which claims priority to U.S. Provisional Application No. 60/427,260, filed Nov. 18, 2002.

BACKGROUND OF THE INVENTION

1. Field of the Invention

The present invention relates computer graphics. More specifically, one or more embodiments of the present invention relate to a rasterizer interpolator.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

Display images are made up of thousands of tiny dots, where each dot is one of thousands or millions of colors. These dots are known as picture elements, or "pixels". A raster is a grid of x and y coordinates in a two dimensional display space, and in a three dimensional display space includes a "z" coordinate. A rasterizer is used to operate on pixels or sub-pixels within the raster grid in order to determine a final color values for the pixels. As will be further explained below, current rasterizers are inefficient. This problem can be better understood by reviewing an example of a graphics systems where a rasterizer might be used.

Graphics System

Each pixel in a raster environment has multiple attributes associated with it, including a color and a texture. The color of each pixel being represented by a number value stored in the computer system. A three dimensional display image, although displayed using a two dimensional array of pixels, may in fact be created by rendering of a plurality of graphical objects.

Examples of graphical objects include points, lines, polygons, and three dimensional solid objects. Points, lines, and polygons represent rendering "primitives" which are the basis for most tendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information.

The draw commands from a program drawing to the display may include, for example, X and Y coordinates for the vertices of the primitive, as well as some attribute parameters for the primitive (color and depth or "Z" data), and a drawing command. The execution of drawing commands to generate a display image is known as graphics processing.

Rasterizers

Graphics processing is typically performed with a rasterizer. A rasterizer receives pixels as input and may perform a scan conversion process on the pixels, apply textures to the pixels, apply color to the pixels, and shade the pixels by mathematically combining all of the results of the scanning, coloring, and texturing into a single final value for a pixel. This final value is typically output to a frame buffer which is configured to store the value temporarily and to provide it to the display device for drawing at the appropriate time.

The manner in which work is distributed to a rasterizer is currently inadequate. In particular, regions of a display screen are typically arranged into tiles. The tiles are used as a way to organize how and when a screen region of pixels will be passed to the rasterizer. One technique uses a rasterizer and arranges the screen into tiles. As geometric primitives are calculated and it is determined where the geometry falls on the screen, a determination is made as to which tiles have which portions of the geometry.

This is shown by example in FIG. 1. The screen 100 is divided into four tiles, tile 0, tile 1, tile 2, and tile 3. Geometry 110 (in this instance a triangle) is partially owned by tiles 0, 1, and 2. Rasterizer 120 receives the tiles (and hence the portions of the geometry) in order (i.e., tile 0, then tile 1, then tile 2). Problems occur, however, because this method is slow since it only rasterizers one tile at a time.

Another common rasterizer implementation uses elongated tiles such as that shown in FIG. 2. Elongated tile 200 has a 4×2 configuration. Narrow vertical line 210 (the geometry to be rendered) only passes through sub-tiles 220 and 230. However, this method has its problems because the tile size is not scaleable and, because of the elongated tile size, many empty tiles with no geometry are processed by the rasterizer, causing waste in time and computational power.

What is needed is a rasterization mechanism that is scaleable and efficient in minimizing wasted power spent on processing empty tiles.

SUMMARY OF THE INVENTION

The present invention relates to a rasterizer interpolator. The rasterizer interpolator comprises of a setup unit that computes coverage of incoming graphics primitives, and a plurality of rasterizer pipelines. Based on the calculation using the primitive's (polygon) vertex data against one or more tiles, graphics primitives are distributed to the rasterizers arrayed in parallel. Each rasterizer is configured to perform its operation at the same time as the other rasterizers. In one embodiment, an output screen is divided into a number of regions. For instance, in one embodiment, the screen is subdivided into four regions, and one of four rasterizers is granted ownership of one quarter of the total screen. The present invention interpolates primitives for various number of parallel rasterizer pipelines in various configurations. In various embodiments, the size of the tiles is configurable. In one embodiment, the tiles are square tiles.

The present invention also comprises of a scan converter working in conjunction with a Hierarchical-Z unit in a z-buffer to perform coarse grain tiling. Coarse grain tiling occurs by a series of iterations performed in parallel. Each region undergoes a tiling process where each tile is reduced to a smaller set of sub-tiles, with the goal of reducing time spent on processing empty tiles and/or non-visible tiles with no graphics primitive coverage. With each successive iteration, a finer level of precision is reached. The scan converter communicates with the Hierarchical-Z unit to calculate the current primitive's visibility, using vertex data from the graphics primitive and z depth information. Briefly, in one embodiment, the process starts with computing a list of tiles that are in a current pipeline and covered by a current graphics primitive. Then a first mask value is generated, with the value specifying which of intermediate (smaller) tiles within each of the tiles on the list are visible. Then the process generates a sub-list containing even smaller quad tiles within the intermediate tiles. Following this, a second mask value is computed, with the value specifying which of quad tiles are visible and a z plane equation. The final result is that primitive's (polygon) coverage is calculated at a detailed level, reducing empty tiles slated for rasterization and thus improving efficiency.

Another embodiment increases raster efficiency by assigning the ownership of tiles in a non-contiguous manner. For instance, a two-raster system might assign every other tile to one of the rasters. This scheme decreases the likelihood that one raster will run out of work (or have no work at all) while the other raster is busy operating on a dense screen region.

Another embodiment of the present invention uses multiple graphics chips, with each chip having multiple parallel rasterizers. The screen is divided into regions and each chip is responsible for a particular region. In one embodiment, a super tiling technique is used to manage the distribution of tiles across multiple graphics chips. In this manner, geometry in each region, adjacent pixels are cached in the chip closest to their neighbors. This embodiment increases cache locality, and hence the efficiency of the tiling process.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to a rasterizer interpolator. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Rasterizer Interpolation

In one embodiment, multiple parallel rasterizers are used. Each rasterizer is configured to perform its operation at the same time as the other rasterizers, each one executing one or more instructions in each clock cycle. An output screen is divided into a number of regions. For instance, in one embodiment, the screen is sub-divided into four regions and one of four rasterizers is granted ownership of each of the regions. In this way, tiles are interpolated to the appropriate pipelines.

Figure 1:
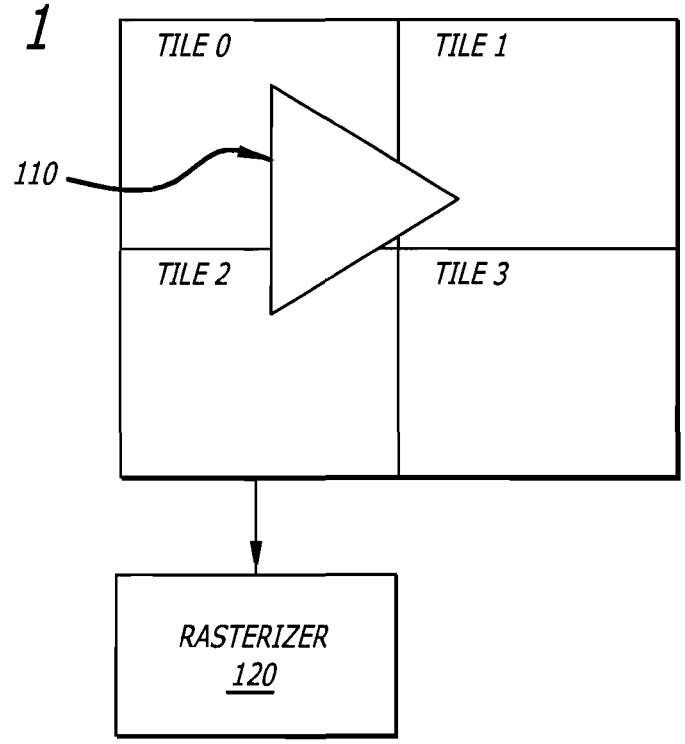
FIG. 1 is a diagram of the operation of a prior art tiling scheme.
Figure 2:
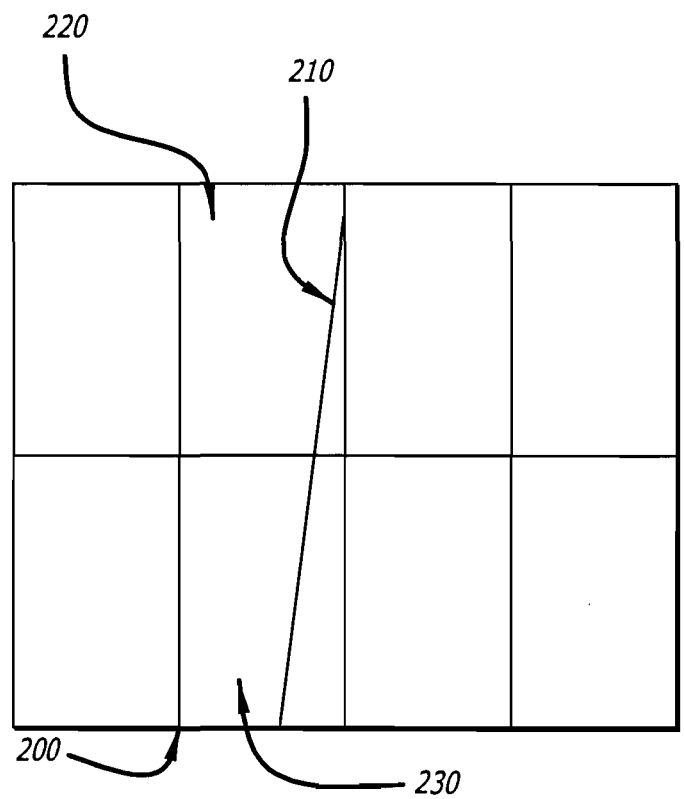
FIG. 2 shows a problem inherent in one prior art tiling scheme.
Figure 3:
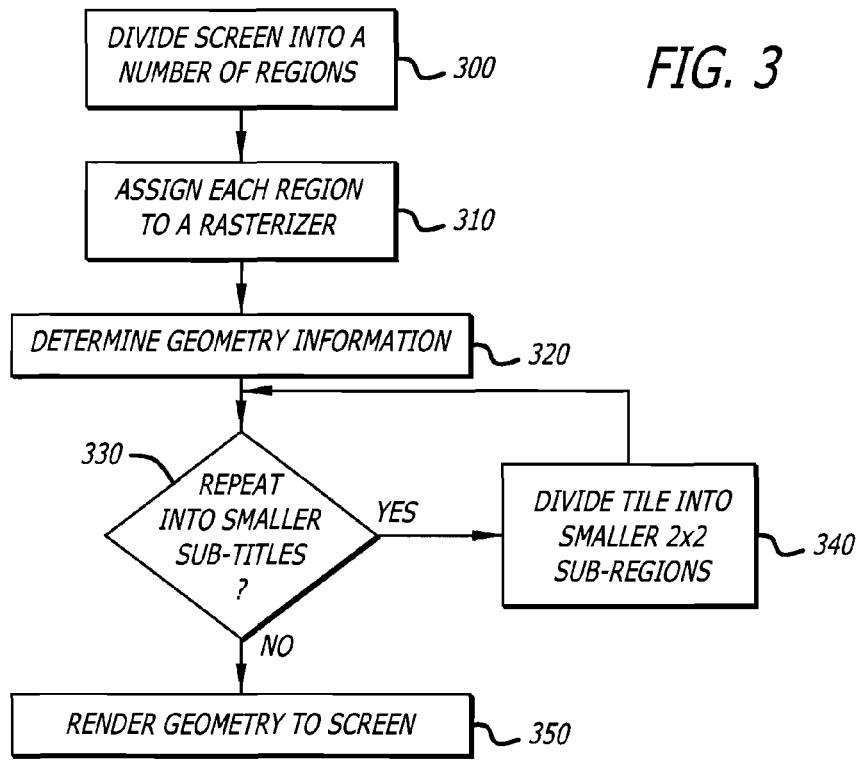
FIG. 3 is a flowchart showing the operation of a rasterizer interpolator according to an embodiment of the present invention.

Coarse grain tiling occurs by a series of iterations performed in parallel. Each region undergoes a tiling process where each tile is reduced to a 2×2 set of sub-tiles. With each successive iteration, another 2×2 level of precision is reached. By tiling in this manner, the number of empty tiles is minimized. The operation of this embodiment of the present invention is shown in the flowchart of FIG. 3. At step 300, a screen region is divided into a number of regions. At step 310, each of the regions is assigned to a rasterizer. At step 320, geometry information is determined. The geometry information relates to the slopes and vertices of a geometric figure that is eventually to be rendered on the screen. By obtaining the geometric information, it is known which regions have which portions of the geometry.

Once the geometric information is determined at step 320, it is determined whether the tiling process should repeat into smaller sub-tiles at step 330. If not, the process is complete and the geometry is drawn to the screen at step 350. Otherwise, each tile in the region is subdivided into a set of smaller 2×2 dies at step 340. This process repeats at step 330 until the desired level of granularity is reached, wherein the geometry is eventually drawn to the screen at step 350.

Figure 4:
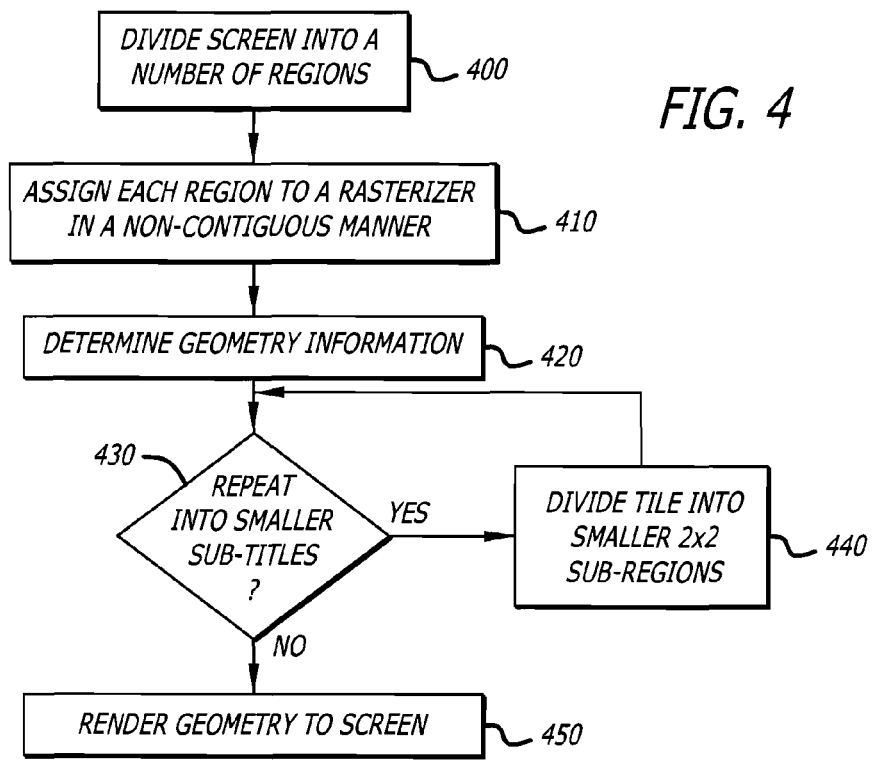
FIG. 4 is a flowchart showing the operation of a rasterizer interpolator according to another embodiment of the present invention.

Another embodiment increases raster efficiency by assigning the ownership of tiles in a non-contiguous manner. For instance, a two-raster system might assign every other tile to one of the rasters. This scheme decreases the likelihood that one raster will run out of work (or have no work at all) while the other raster is busy operating on a dense screen region. The operation of this embodiment is shown in FIG. 4.

At step 400, a screen region is divided into a number of regions. At step 410, each of the regions is assigned to a rasterizer in a non-contiguous manner. At step 420, geometry information is determined. Once the geometric information is determined at step 420, it is determined at step 430 whether the tiling process should repeat into smaller sub-tiles. If not, the process is complete and the geometry is rendered to the screen at step 450. Otherwise, each tile in the region is subdivided into a set of smaller 2×2 tiles at step 440. This process repeats until the desired level of granularity is reached, wherein the geometry is eventually drawn to the screen at step 450.

Rasterizer Interpolation Architecture

Figure 5:
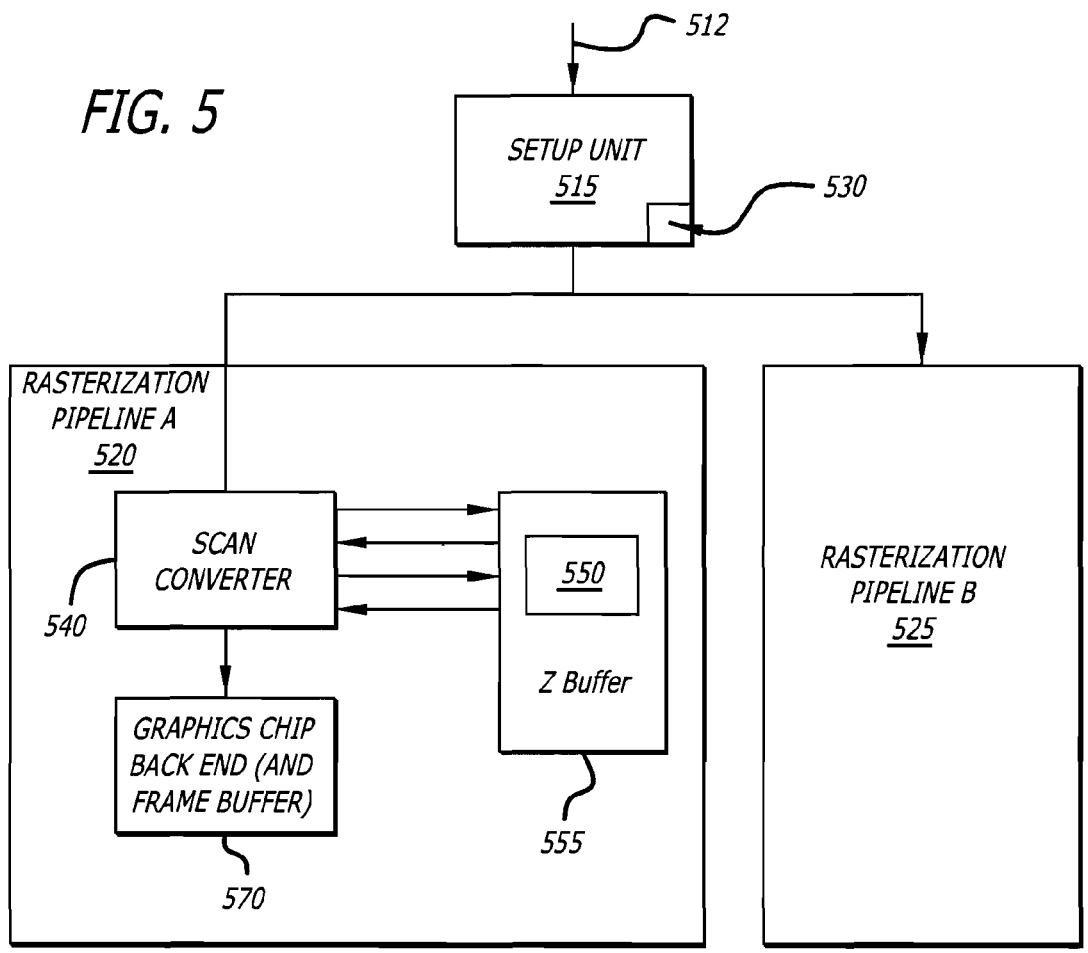
FIG. 5 is an architecture for rasterizer interpolation according to an embodiment of the present invention.

One embodiment of a rasterizer interpolation architecture is shown in FIG. 5. In operation, incoming triangle list data comes in through a data stream 512 into a set-up unit 515. Set-up unit 515 generates slope and initial value information for each of the texture coordinate, color, or Z parameters associated with the primitive. The resulting set-up information is passed to one or more parallel pipelines. In the current example there are two pipelines, pipeline 520 and pipeline 525, but the present invention contemplates any configuration of parallel pipelines. In this example, each pipeline owns one-half of the screen's pixels. In another example, there are four pipelines and each pipeline would own one-quarter of the screen's pixels. Allocation of work between the pipelines is made based on a repeating square pixel tile pattern. In one embodiment, logic 530 in the set-up unit 515 intersects the graphics primitives with the tile pattern such that a primitive is only sent to a pipeline if it is likely that it will result in the generation of covered pixels. The setup unit is thus responsible for determining which of the raster pipes will receive the computed polygon information.

Each pipeline operates on four pixels at a time, the four pixels are arranged in a 2×2 tile (called a "quad"). Each pipeline contains an input FIFO used to balance the load over different pipelines. A scan converter 540 steps through the geometry (e.g., triangle or parallelogram) within the bounds of the pipeline's tile pattern. In one embodiment, initial stepping is performed at a coarse level. For each of the coarse level tiles, a minimum (i.e., closest) Z value is computed. This is compared with the farthest Z value for the tile stored in a Hierarchical-Z buffer 550. If the compare fails, the tile is rejected.

The Hierarchical-Z compare block 550 passes the coarse level tile and subdivides it into the quad's 2×2 pixel tiles. For each covered quad, the x and y screen coordinate is output, together with a sub-pixel coverage mask, and a z-plane equation (slope and a reference value at the center of the quad). The Z-buffer 555 copies the incoming quad coordinate, mask, and Z-plane to the output. In one embodiment, if top of pipe Z-buffering is enabled, this block performs Z-buffering on all of the covered samples, and modifies the coverage masks appropriately, discarding the quad if all mask bits are zero. Once the processing is completed, data is forwarded to other back-end components 570 including the frame buffer for display.

Set-Up Unit

Figure 6:
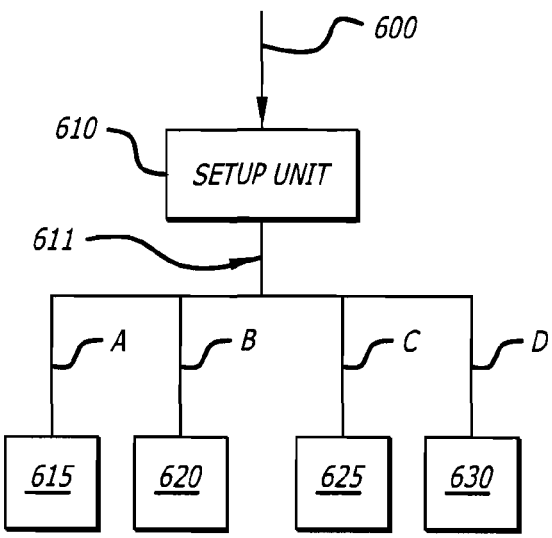
FIG. 6 shows a setup unit according to an embodiment of the present invention.

With reference to the set-up unit 515 shown in FIG. 5, its interfaces and functionalities are described in conjunction with FIGS. 6-9. In FIG. 6, a single stream 600 is passed to the setup unit 610, which generates slope and initial value information for each of the texture coordinate, color, or Z parameters associated with the primitive. The resulting setup information 611 is then passed to one or more pipelines. In this example there are four pipelines, labeled A-D, which transport the pixels to their associated rasterizers 615, 620, 625, or 630.

Each of the pipelines owns a logical screen area. For instance, if two pipelines are activated, then they each own one half of the screen pixels. The SU 610 contains logic by which it intersects the graphics primitives with the tile pattern that divides the screen so that a primitive is only sent to a pipeline if it is likely that it will result in the generation of covered pixels.

Figure 7:
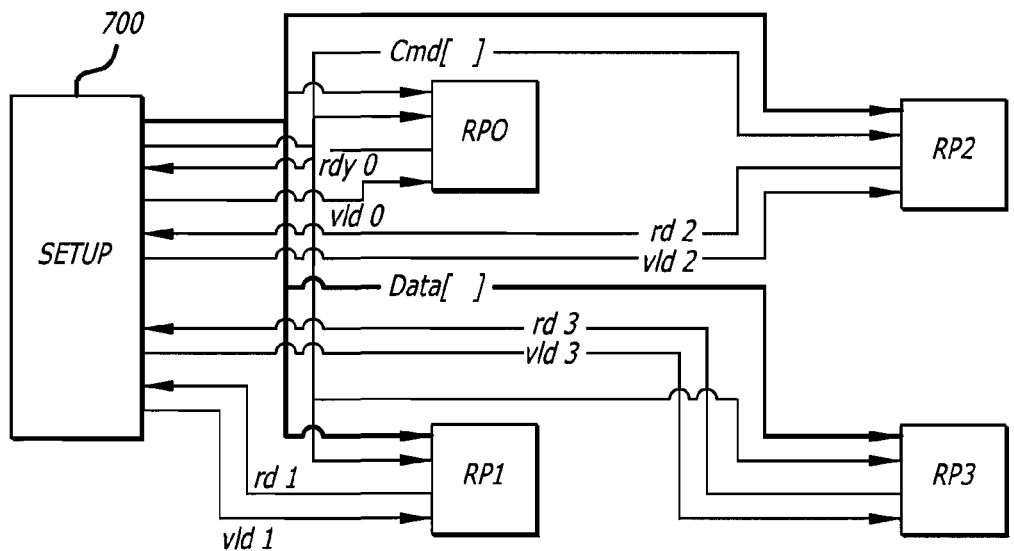
FIG. 7 shows a setup unit interfacing with four raster pipes according to an embodiment of the present invention.

One embodiment of a setup unit interfacing with multiple raster pipes is shown in FIG. 7, where setup unit 700 communicates with four raster pipes labeled RP0, RP1, RP2, and RP3.

Tiling Scheme in Setup Unit

Figure 8A:
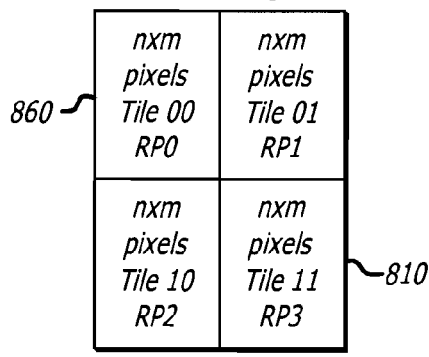
FIG. 8A shows a tile configuration according to an embodiment of the present invention.
Figure 8B:
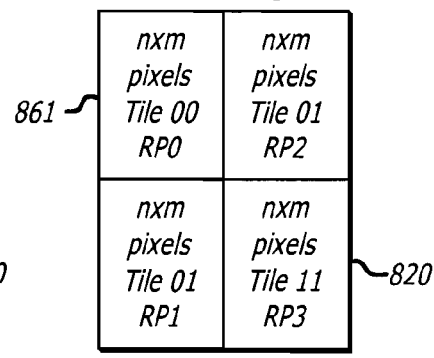
FIG. 8B shows a tile configuration according to an embodiment of the present invention.
Figure 8C:
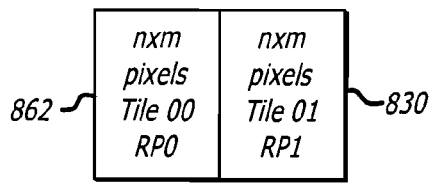
FIG. 8C shows a tile configuration according to an embodiment of the present invention.
Figure 8D:
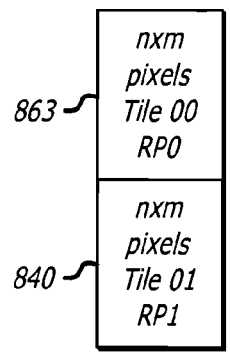
FIG. 8D shows a tile configuration according to an embodiment of the present invention.
Figure 8E:
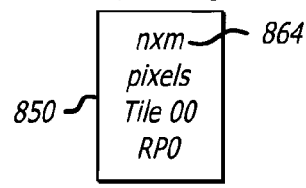
FIG. 8E shows a tile configuration according to an embodiment of the present invention.
Figure 9:
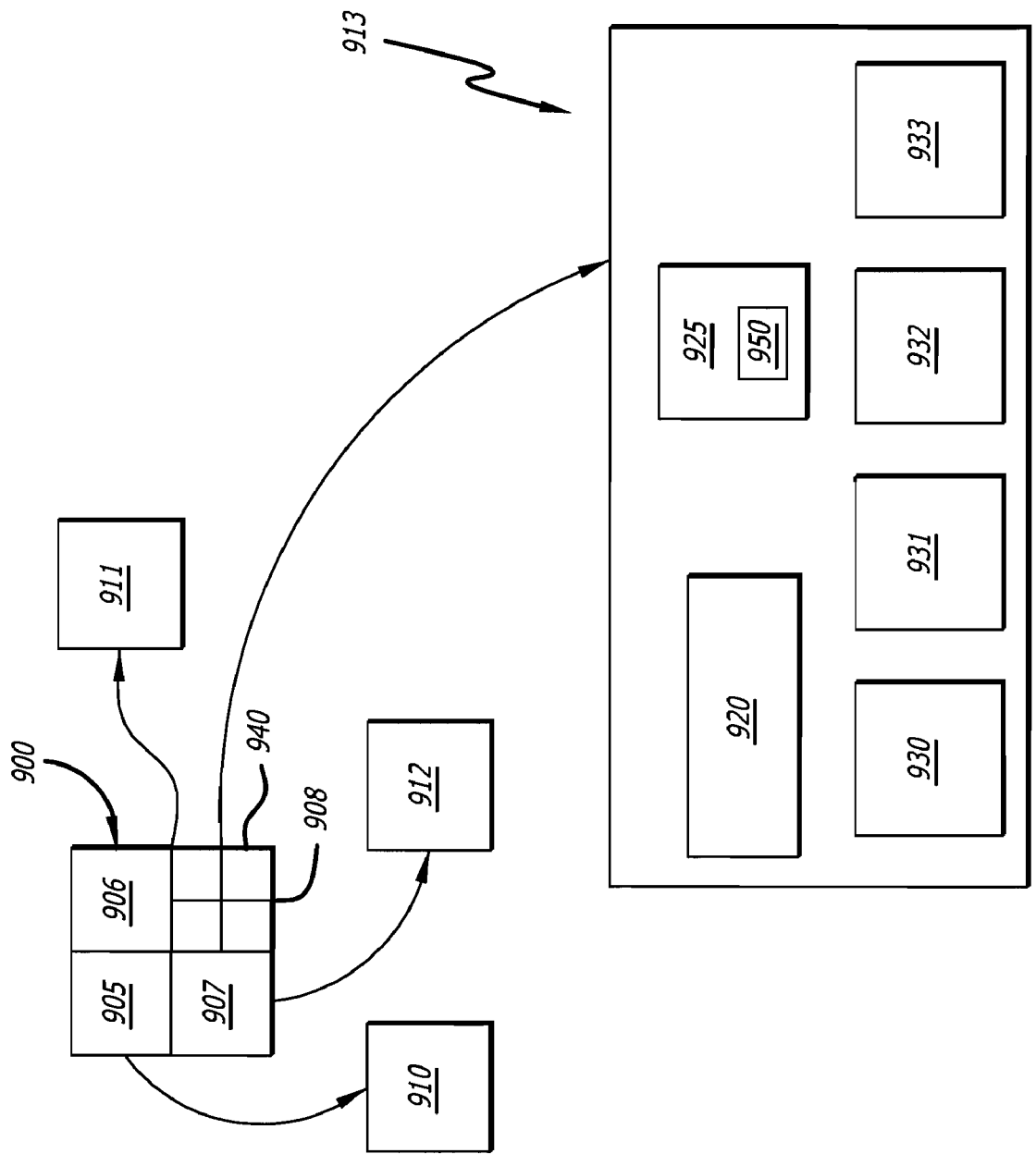
FIG. 9 shows an architecture suitable for super tiling according to an embodiment of the present invention.

As mentioned before, the setup unit is responsible for determining which of the raster pipes will receive the computed polygon information. Five possible configurations are shown in FIGS. 8A-8E. FIGS. 8A and 8B show four-pipe configurations 800 and 820. FIGS. 8C and 8D show two-pipe configurations 830 and 840 and FIG. 8E shows a single pipe configuration 850. The number of pipelines and the configuration of the pipelines (e.g., the configurations of FIGS. 8A and 8B for a four pipe configuration) are dynamically configurable in the control of the setup unit. The actual physical pipelines do not need to be present, unless a pipe configuration setup requires it.

The tile size is also configurable. Tiles are not required to be square, but the sizes of the width (n) and height (m) are powers of 2 to ensure scalablility in the present invention. Each tile has a tile configuration register. The value stored in the tile configuration register will be the $\log_2$ of the width and height. Preferably, the size of the screen is an integer multiple of the size of the tile. The Tile RP0's upper coordinates 860, 861, 862, 863, and 864 are the locations (0,0) in (x,y) screen coordinates.

Per polygon, the setup unit will determine which types of tiles are covered in the current configuration for the current polygon. Once a coverage is computed, the computed polygon's values will be sent to the appropriate pipelines or pipelines. Below is an algorithm to compute tile coverage according to one embodiment of the present invention:

Compute V0.x.tile=V0.x>>n
    Compute V1.x.tile=V1.x>>n
    Compute V2.x.tile=V2.x>>n
    Compute V0.y.tile=V0.y>>m
    Compute V1.y.tile=V0.y>>m
    Compute V2.y.tile=V2.y>>m
    Tile (V0.RP) is determined to be the tile where (V0.x.tile, V0.y.tile) is located
    Tile (V1.RP) is determined to be the tile where (V1.x.tile, V1.y.tile) is located
    Tile (V2.RP) is determined to be the tile where (V2.x.tile, V2.y.tile) is located
    Switch(# pipes)
    For 1 Pipe:
    Done, send polygon to pipe
    For 2 Pipes:
    Config 0: If max(|v0.x.tile-v1.x.tile|, |v0.x.tile-v2.x.tile|, |v1.x.tile-v2.x.tile|)>1, {RP0, RP1} are covered
    Config 1: If max(|v0.y.tile-v1.y.tile|, |v0.y.tile-v2.y.tile|, |v1.y.tile-v2.y.tile|)>1, {RP0, RP1} are covered
    Default: If (V0.RP & V1.RP and V2.RP are in same tile), V0.RP is only tile covered else {RP0, RP1} is covered
    For 4 Pipes:
    Config 0:
    Switch({(max(|v0.x.tile-v1.x.tile|, |v0.x.tile-v2.x.tile|, |v1.x.tile-v2.x.tile|)>1), (max(|v0.y.tile-v1.y.tile|, |v0.y.tile-v2.y.tile|, |v1.y.tile-v2.y.tile|)>1)})
    0  0:  Switch({V0.RP==V1.RP,  V2.RP==V1.RP, V0.RP==V2.RP})
    0 0 0: {RP0, RP1, RP2, RP3} are covered
    0 0 1: RP of V0.RP/V2.RP and RP of V1.RP are covered
    0 1 0: RP of V1.RP.V2.RP and RP of V0.RP are covered 1 0 0: RP of V0.RP/V1.RP and RP of V2.RP are covered
default: RP of V0.RP is covered
   0   1:   Switch({V0.RP==V1.RP,   V2.RP==V1.RP, V0.RP==V2.RP})
   0 0 0: {RP0, RP1, RP2, RP3} are covered
   0 0 1: RP of V0.RP/V2.RP and RP of V1.RP, All vertical tiles too covered
   0 1 0: RP of V1.RP/V2.RP and RP of V0.RP, All vertical tiles too covered
   1 0 0: RP of V0.RP/V1.RP and RP of V2.RP, All vertical tiles too covered
   default: Tile {RP0, RP2} or {RP1, RP3} based on V0.RP are covered
   1   0:   Switch({V0.RP==V1.RP,   V2.RP==V1.RP, V0.RP==V2.RPI})
   0 0 0: {RP0, RP1, RP2, RP3} are covered
   0 0 1: RP of V0.RP/V2.RP and RP of V1.RP, All horizon. tiles too covered
   0 1 0: RP of V1.RP/V2.RP and RP of V0.RP, All horizon. tiles too covered
   1 0 0: RP of V0.RP/V1.RP and RP of V2.RP, All horizon. tiles too covered
   default Tile {RP0, RP1} or (RP2, RP3} based on V0.RP are covered
   1 1: Tile {RP0, RP1, RP2, RP3} are covered
Config 1:
   Switch({(max(|v0.x.tile-v1.x.tile|,   |v0.x.tile-v2.x.tile|, |v1.x.tile-v2.x.tile|)>1), (max(|v0.y.tile-v1.y.tile|, |v0.x.tile-v2.y.tile|, |v1.y.tile-v2.y.tile|)>1)})
   0   0:   Switch({V0.RP==V1.RP,   V2.RP==V1.RP, V0.RP==V2.RP})
   0 0 0: {RP0, RP1, RP2, RP3} are covered
   0 0 1: RP of V0.RP/V2.RP and RP of V1.RP are covered
   0 1 0: RP of V1.RP.V2.RP and RP of V0.RP are covered
   1 0 0: RP of V0.RP/V1.RP and RP of V2.RP are covered
   default: RP of V0.RP is covered
   0   1:   Switch({V0.RP==V1.RP,   V2.RP==V1.RP, V0.RP==V2.RP})
   0 0 0: {RP0, RP1, RP2, RP3) are covered
   0 0 1: RP of V0.RP/V2.RP and RP of V1.RP, All vertical tiles too covered
   0 1 0: RP of V1.RP/V2.RP and RP of V0.RP, All vertical tiles too covered
   1 0 0: RP of V0.RP/V1.RP and RP of V2.RP, All vertical tiles too covered
   default: Tile {RP0, RP1} or {RP2, RP3} based on V0.RP are covered
   1   0:   Switch({V0.RP==V1.RP,   V2.RP==V1.RP, V0.RP==V2.RP})
   0 0 0: {RP0, RP1, RP2, RP3} are covered
   0 0 1: RP of V0.RP/V2.RP and RP of V1.RP, All horizontal tiles too covered
   0 1 0: RP of V1.RP/V2.RP and RP of V0.RP, All horizontal tiles too covered
   1 0 0: RP of V0.RP/V1.RP and RP of V2.RP, All horizontal tiles too covered
   default: Tile {RP0, RP2} or {RP1, RP3} based on V0.RP are covered
   1 1: Tile {RP0, RP1, RP2, RP3} are covered Briefly, the algorithm performs pixel coverage calculation by taking into account the various different configurations shown in FIGS. 8A-8E. The algorithm takes into account the vertices of the incoming polygon (encoded V0, V1, and V2), the size of the tiles (encoded m and n), the number of pipes present (switch on the number of pipes), and which configuration to use given the number of pipes (e.g. Config. 0 or Config. 1). The end result is the determination of tile coverage. The coverage mask identifies which of the available tiles in a given configuration are covered, (e.g. within a quad or pair of tiles). For a 2×2 quad of tiles, the possible solutions will be: {RP0}, {RP1}, {RP2}, {RP3}, {RP0, RP1}, {RP0, RP2}, {RP1, RP3}, {RP2, RP3}, {RP1, RP2, RP3, RP4}.

Super Tiling

One embodiment of the present invention uses a super tiling scheme. This scheme may be useful in a larger design, where multiple graphics chips are used in parallel to increase fill rate. Super tiling involves sub-dividing the screen into groups of 2×2 tiles. In one embodiment, each group is drawn by a separate 4-pipe rendering engine. It is the responsibility of the setup unit to discover if the polygon covers one of the 2×2 tiles that any particular chip is responsible for.

The specification of the super tile is an x and y super tile stride value, as well as a super tile x and y start value. The stride will be the integer log 2 number that indicates "how far" two consecutive 2×2 super tiles are in super-tile coordinates (must be power of 2 in a scalable configuration). The location of the start x,y of the super tile will be the location, in super tile coordinates, of the first 2×2 super tile in x and y.

Below is one example of a super-tiling algorithm:
   Compute   V0.ST=(V0.tile.x>>ST_x_stride, V0.tile.y>>ST_y_stride
   Compute   V1.ST=(V1.tile.x>>ST_x_stride, V1.tile.y>>ST_y_stride
   Compute   V2.ST=(V2.tile.x>>ST_x_stride, V2.tile.y>>ST_y_stride
   Compute MaxWidth=Max(|V0.ST.x-V1.ST.x|, |V0.ST.x-V2.ST.x|, |V1.ST.x-V2.ST.x|)
   Compute MaxHeight=Max(|V0.ST.y-V1.ST.y|, |V0.ST.y-V2.ST.y|, |V1.ST.y-V2.ST.y|)
   Compute   Vmin.ST.x=mod_ST_x_stride(min(V0.ST.x, V1.ST.x, V2.ST.x))
   Compute   Vmin.ST.y=mod_ST_y_stride(min(V0.ST.y, V1.ST.y, V2.ST.y))
   If   (((Vmin.ST.x>=ST_x_start)   and   (Vmin.ST.x+MaxWidth<=ST_x_start)) or
   (MaxWidth>=ST_x_stride)) and
   ((Vmin.ST.y>=ST_y_start) and (Vmin.ST.y+MaxHeight<=ST_y_start)) or
   (MaxHeight>=ST_y_stride)) accept polygon
   Else Reject Polygon It is possible to use only 2 raster chips, in which case either X or Y dominance is used (set ST_x_stride to 1 and ST_y_stride to 0, or vice-versa). For 4 raster chips, the strides should be set to 1 and 1 (or 2 and 0 or 0 and 2).

In this manner, geometry in each region, adjacent pixels are cached in the chip closer to their neighbors. This embodiment increases cache locality, and hence the efficiency of the tiling process. This embodiment is shown in the block diagram of FIG. 9. Screen region 900 is divided into four regions 905, 906, 907, and 908 in this example, though alternate configurations are possible. Region 905 maps to graphics chip 910. Region 906 maps to graphics chip 911. Region 907 maps to graphics chip 912. Region 908 maps to graphics chip 913. Graphics chip 913 is expanded to show more detail but is otherwise the same as the other graphics chips 910, 911, and 912.

Graphics chip 913 includes a cache 920 and graphics processing hardware 925 to control the operation of parallel rasterizers 930, 931, 932, and 933. For instance, screen region 908 might be sub-divided into smaller regions, where each region is mapped to a particular rasterizer. Take, for example, smaller region 940 that might be mapped in one embodiment, by a setup unit 950 in the graphics processing hardware 925 to rasterizer 930.

Scan Converter—Coarse Grain Tiling Process

With reference back to FIG. 5, once the instructions are sent by setup unit to the individual pipelines, scan converter 540 operates on these instructions. Scan converter 540 steps through the geometry (e.g., triangle or parallelogram) within the bounds of the pipeline's tile pattern. In one embodiment, initial stepping is performed at a coarse level, with sub-division iterations performed with conjunction to Hierarchical-Z component 550 and Z-buffer 555.

Figures 10A, 10B, 10C:
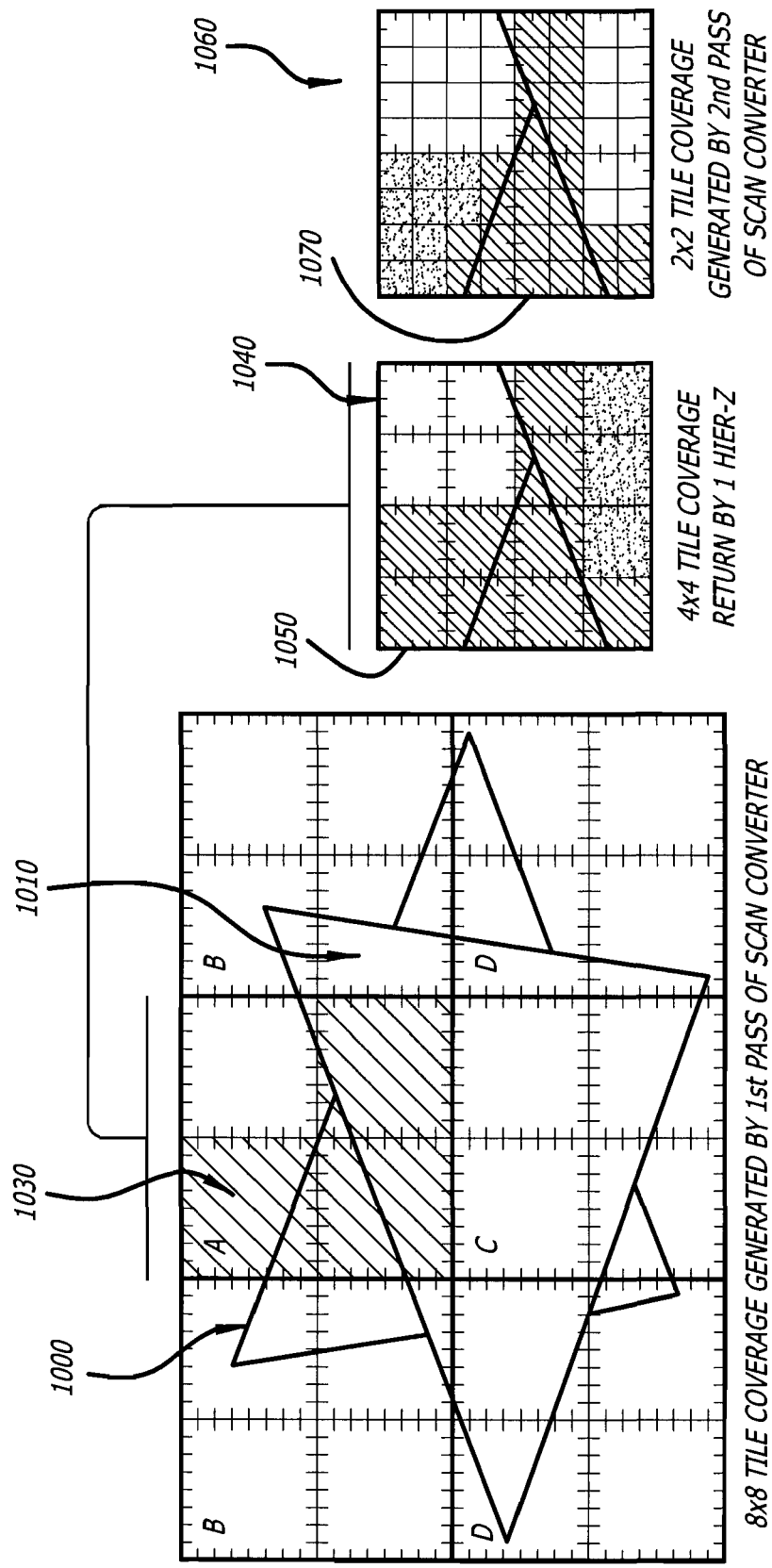
FIG. 10A shows a scan conversion process according to an embodiment of the present invention.
FIG. 10B shows a Hierarchical-Z operation according to an embodiment of the present invention.
FIG. 10C shows a second pass of a scan conversion process according to an embodiment of the present invention.
Figure 10D:
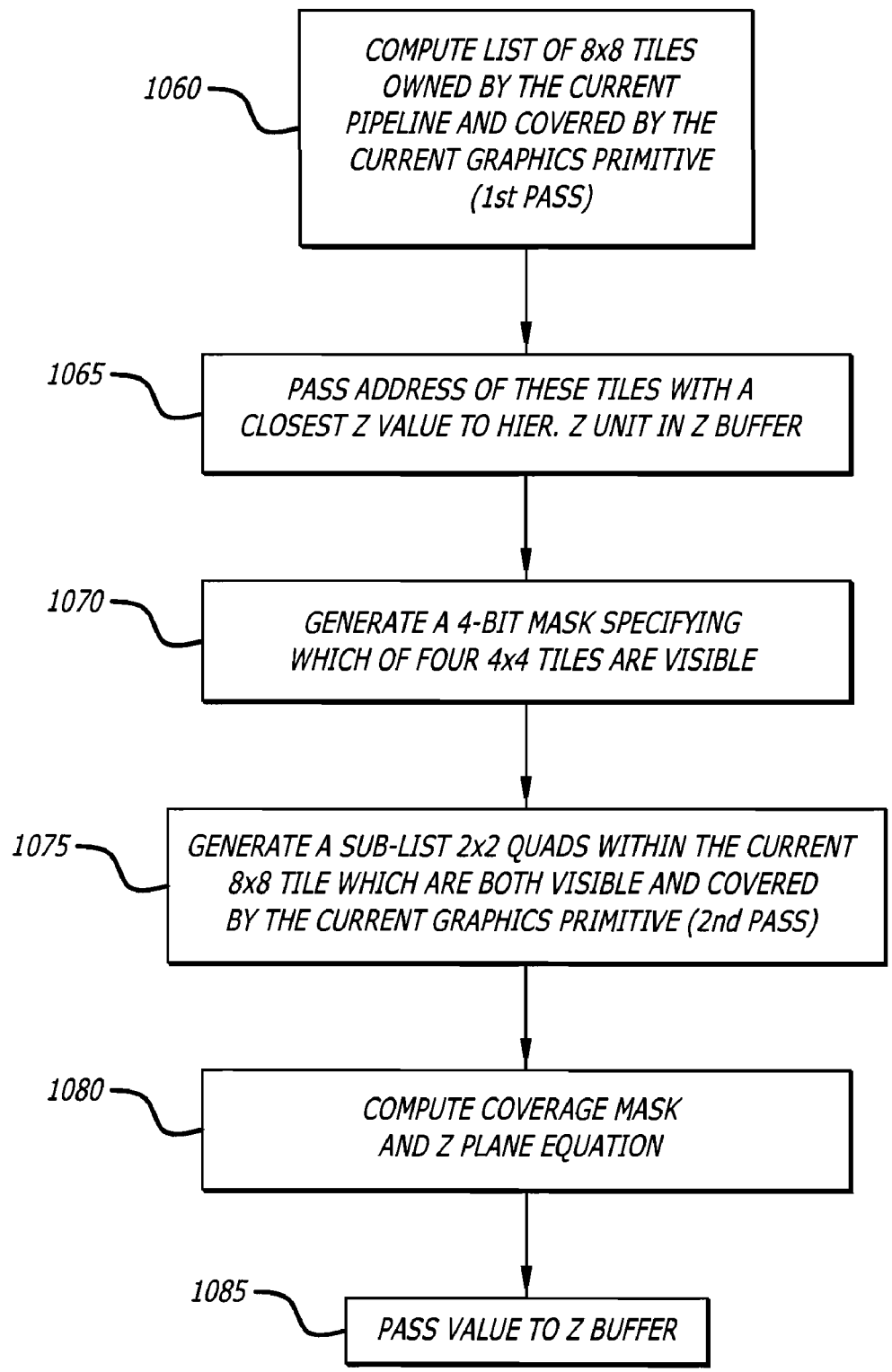
FIG. 10D shows the process of coarse grain tiling operation with a scan conversion and Hierarchical-Z unit according to an embodiment of the present invention.

The operation of scan converter and Hierarchical-Z unit is shown in FIG. 10D. In one embodiment, the scan converter performs the scan conversion of triangles or parallelograms in two stages (passes). In step 1060, the scan converter computes a list of size 8×8 tiles that are both owned by the current pipeline, and covered by the current graphics primitive. This is the first pass. In step 1065, the address of these tiles, together with a reduced precision version of the closest z value, is passed to a Hierarchical-Z unit in a Z Buffer (zb). In step 1070, the Hierarchical-Z unit returns a 4-bit mask specifying which of four size 4×4 tiles are visible. In step 1075, the scan converter then generates a sub-list containing all the size 2×2 quads within the current 8×8 tile which are both visible and covered by the current graphics primitive. This is the second pass. In step 1080, for each of these 2×2 quads, the scan converter computes a 32-bit coverage mask (assuming 8 samples per pixel), and a z plane equation. In step 1085, these values are then passed back to the Z Buffer for fine grain early Z buffering at high precision.

An example of a scan converter embodiment operating in conjunction with a Z buffer is shown in FIGS. 10A-10C. FIG. 10A shows a plurality of tiles ("A"-"D") dedicated to respective graphics pipelines, and that each pipeline is dedicated to one portion of an output screen with the setup unit (515) distributing instructions to the pipelines. As shown in FIG. 10A, each portion of the output screen includes a plurality of the tiles that are contiguous and arranged in substantially similar pattern (e.g. 2×2 "A" tiles, 2×2 "B" tiles and so on). The triangle being rasterized (1000) in FIG. 10A is partially hidden by a previously drawn triangle 1010. FIG. 10A shows the result from the first pass of the scan conversion (step 1060 of FIG. 10D). In this example, only the tiles dedicated to the "A" pipeline's operations are illustrated, and so only tiles interpolated to that pipeline (tiles within area 1030) and rasterizer are considered. Tiles of size 8×8 are generated during this operation, with the computed coverage within the tiles shown in gray. Note that the 64 sub-tiles with the "A" tile are not illustrated. At this stage, the scan conversion is done at the coarsest level.

Diagram 1040 of FIG. 10B shows the result of a Hierarchical-Z operation. The computed coverage 4×4 tiles 1050 generated during this operation are shown in dark gray (step 1070 of FIG. 10D). Diagram 1060 of FIG. 10C shows the result of the second pass of Scan Conversion (step 1075 of FIG. 10D). The computed coverage are done at the level of 2×2 tiles. The computed coverage (quads) 1070 generated during this operation are shown in dark gray. Note that a total of 25 quads are generated for this triangle (number of dark gray rectangles in FIG. 10C). Without Hierarchical-Z, the count would be 37 (number of dark gray rectangles+light gray rectangles). Thus, the present invention reduces the number of tiles that need to be processed and hence speeds up overall operation. Those skilled in the art can appreciate that the sizes of the tiles can be scaled up or down by in this iterative process, preferably by a factor of 2. The sizes of 2×2, 4×4, and 8×8 are sizes used in just one example.

Multi-Chip Application

In one embodiment, a register is used to specify the tile format for use in a multi-chip system (e.g. a flight simulator). This affects the allocation of tiles among pipelines, and therefore the tile pattern used by each tile for scan conversion. In one embodiment, the register has a field "chip_count" that specifies the total number of chips in the system. It also has a field "chip_id" that specifies the id of the present chip.

Embodiment of Computer Execution Environment (Hardware)

Figure 11:
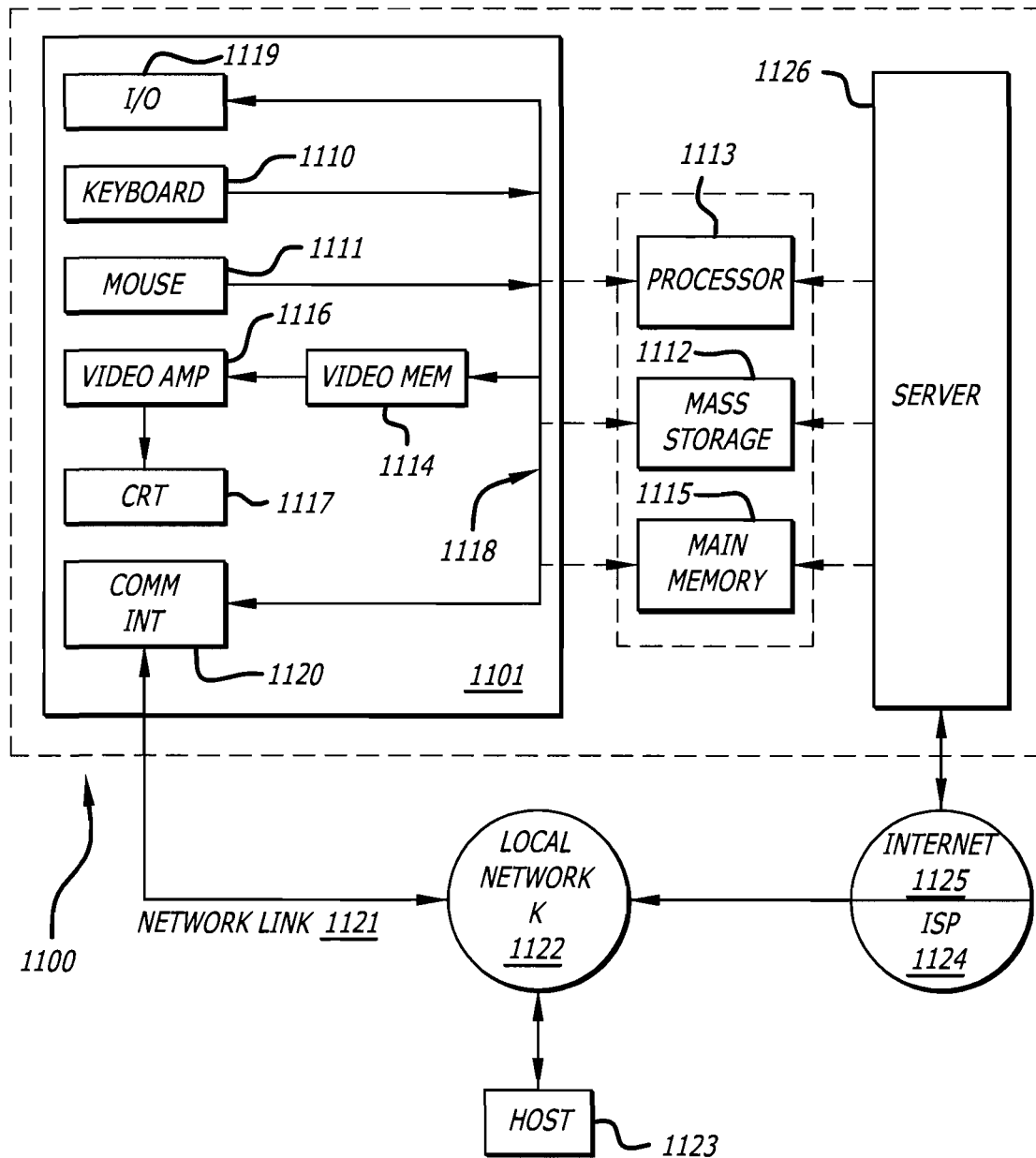
FIG. 11 is an embodiment of a computer execution environment.

An embodiment of the invention can be implemented as computer software in the form of computer readable program code executed in a general purpose computing environment such as environment 1100 illustrated in FIG. 11, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1110 and mouse 1111 are coupled to a system bus 1118. The keyboard and mouse are for introducing user input to the computer system and communicating that user input to central processing unit (CPU) 1113. Other suitable input devices may be used in addition to, or in place of, the mouse 1111 and keyboard 1110. I/O (input/output) unit 1119 coupled to bidirectional system bus 1118 represents such I/O elements as a printer, A/V (audio/video) I/O, etc.

Computer 1101 may include a communication interface 1120 coupled to bus 1118. Communication interface 1120 provides a two-way data communication coupling via a network link 1121 to a local network 1122. For example, if communication interface 1120 is an integrated services digital network (ISDN) card or a modem, communication interface 1120 provides a data communication connection to the corresponding type of telephone line, which comprises part of network link 1121. If communication interface 1120 is a local area network (LAN) card, communication interface 1120 provides a data communication connection via network link 1121 to a compatible LAN. Wireless links are also possible. In any such implementation, communication interface 1120 sends and receives electrical electromagnetic or optical signals which carry digital data streams representing various types of information.

Network link 1121 typically provides data communication through one or more networks to other data devices. For example, network link 1121 may provide a connection through local network 1122 to host 1123 or to data equipment operated by ISP 1124. ISP 1124 in turn provides data communication services through the world wide packet data communication network now commonly referred to as the "Internet" 1125. Local network 1122 and Internet 1125 may use electrical, electromagnetic or optical signals which carry digital data streams. The signals through the various networks and the signals on network link 1121 and through communication interface 1120, which carry the digital data to and from computer 1100, are exemplary forms of carrier waves transporting the information.

Processor 1113 may reside wholly on client computer 1101 or wholly on server 1126 or processor 1113 may have its computational power distributed between computer 1101 and server 1126. Server 1126 symbolically is represented in FIG. 11 as one unit, but server 1126 can also be distributed between multiple "tiers". In one embodiment, server 1126 comprises a middle and back tier where application logic executes in the middle tier and persistent data is obtained in the back tier. In the case where processor 1113 resides wholly on server 1126, the results of the computations performed by processor 1113 are transmitted to computer 1101 via Internet 1125, Internet Service Provider (ISP) 1124, local network 1122 and communication interface 1120. In this way, computer 1101 is able to display the results of the computation to a user in the form of output.

Computer 1101 includes a video memory 1114, main memory 1115 and mass storage 1112, all coupled to bidirectional system bus 1118 along with keyboard 1110, mouse 1111 and processor 1113. As with processor 1113, in various computing environments, main memory 1115 and mass storage 1112, can reside wholly on server 1126 or computer 1101, or they may be distributed between the two. Examples of systems where processor 1113, main memory 1115, and mass storage 1112 are distributed between computer 1101 and server 1126 include the thin-client computing architecture developed by Sun Microsystems, Inc., the palm pilot computing device and other personal digital assistants, Internet ready cellular phones and other Internet computing devices, and in platform independent computing environments, such as those that utilize the Java technologies also developed by Sun Microsystems, Inc.

The mass storage 1112 may include both fixed and removable media, such as magnetic, optical or magnetic optical storage systems or any other available mass storage technology. Bus 1118 may contain, for example, thirty-two address lines for addressing video memory 1114 or main memory 1115. The system bus 1118 may also include, for example, a 32-bit data bus for transferring data between and among the components, such as processor 1113, main memory 1115, video memory 1114 and mass storage 1112. Alternatively, multiplex data/address lines may be used instead of separate data and address lines.

In one embodiment of the invention, the processor 1113 is a microprocessor manufactured by Motorola, such as the 680×0 processor or a microprocessor manufactured by Intel, such as the 80×86, or Pentium processor, or a SPARC microprocessor from Sun Microsystems, Inc. However, any other suitable microprocessor or microcomputer may be utilized. Main memory 1115 may be comprised of dynamic random access memory RAM). Video memory 1114 may be a dual-ported video random access memory. One port of the video memory 1114 may be coupled to video amplifier 1116. The video amplifier 1116 may be used to drive a display/output device 1117, such as a cathode ray tube (CRT) raster monitor. Video amplifier 1116 is well known in the art and may be implemented by any suitable apparatus. This circuitry converts pixel data stored in video memory 1114 to a raster signal suitable for use by display/output device 1117. Display/output device 1117 may be any type of monitor suitable for displaying graphic images.

Computer 1101 can send messages and receive data, including program code, through the network(s), network link 1121, and communication interface 1120. In the Internet example, remote server computer 1126 might transmit a requested code for an application program through Internet 1125, ISP 1124, local network 1122 and communication interface 1120. The received code may be executed by processor 1113 as it is received, and/or stored in mass storage 1112, or other non-volatile storage for later execution. In this manner, computer 1100 may obtain application code in the form of a carrier wave. Alternatively, remote server computer 1126 may execute applications using processor 1113, and utilize mass storage 1112, and/or video memory 1115. The results of the execution at server 1126 are then transmitted through Internet 1125, ISP 1124, local network 1122 and communication interface 1120. In this example, computer 1101 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives and servers on a network.

The computer systems described above are for example only. An embodiment of the invention may be implemented in any type of computer system or programing or processing environment.

Thus, a rasterizer interpolator is described in conjunction with one or more specific embodiments. The invention is defined by the claims and their fill scope of equivalents.

The invention claimed is:

1. A rasterizer interpolator comprising:
    a setup unit for calculating pixel coverage of a graphics primitive against one or more tiles and minimizing empty tiles by reducing tiles to sub-tiles;
    a plurality of graphics pipelines, wherein each pipeline is dedicated to one of a plurality of screen regions with said setup unit distributing instructions to said pipelines,
    wherein the plurality of screen regions are divided into a plurality of tiles that are contiguous and similar; and
    wherein each pipeline further comprises:
    a rasterizer configured to receive said primitive determined to result in the generation of covered pixels in tiles in the screen region dedicated to said pipeline, and perform one or more graphics processing operations on said plurality of tiles that are contiguous and similar.

2. The rasterizer interpolator of claim 1 wherein said rasterizer further includes:
    a scan converter and a Hierarchical-Z unit configured to perform a coarse grain tiling process on said tiles.

3. The rasterizer interpolator of claim 2 wherein said scan converter computes a list of tiles in said pipeline covered by said graphics primitive.

4. The rasterizer interpolator of claim 2 wherein said Hierarchical-Z unit works in conjunction with the data from said scan converter to compute a list of visible tiles in said pipeline covered by said graphics primitive.

5. The rasterizer interpolator of claim 1 wherein said setup unit uses polygon vertex data in said primitive to calculate pixel coverage.

6. The rasterizer interpolator of claim 5 wherein said calculation performed by said setup unit dynamically takes into account different configurations of said plurality of graphics pipelines.

7. The rasterizer interpolator of claim 1 wherein the size of said tiles is configurable.

8. The rasterizer interpolator of claim 1 wherein the width and height of said tiles are the same.

9. The rasterizer interpolator of claim 1 wherein the number of said plurality of screen regions is $2^n$.

10. A rasterizer interpolator comprising:
    a setup unit for calculating pixel coverage of a graphics primitive against one or more tiles and for minimizing empty tiles by reducing tiles to sub-tiles;
    a plurality of graphics chips, wherein each chip is dedicated to one of a plurality of screen regions with said setup unit distributing instructions to said chips,
    wherein the plurality of screen regions are divided into a plurality of tiles that are contiguous and similar; and
    wherein each chip further comprises:
    a plurality of parallel pipelines configured to receive said primitive determined to result in the generation of covered pixels in tiles in the screen region dedicated to said pipeline and perform one or more graphics processing operations on said plurality of tiles that are contiguous and similar.

11. The rasterizer interpolator of claim 10 wherein said setup unit performs super tiling in distributing said tiles to said plurality of graphics chip.

12. The rasterizer interpolator of claim 10 wherein said graphics processing operations include coarse grain tiling.

13. The rasterizer interpolator of claim 10 further comprising:
a cache in each of said graphics chips configured to store said tiles.

14. A method for interpolating tiles to a rasterizer comprising:
determining pixel coverage of a plurality of graphics primitives against one or more tiles and minimizing empty tiles by reducing tiles to sub-tiles;
distributing said primitives to one or more pipelines, wherein each of said pipelines is granted ownership to a plurality of said tiles that are contiguous and similar in a designated screen region;
using a rasterizer in each of said pipeline to receive said primitives and perform one or more graphics processing operations on said tiles that are contiguous and similar.

15. The method of claim 14 wherein said determining uses polygon vertex data in said primitives to calculate pixel coverage.

16. The method of claim 14 wherein said determining dynamically takes into account different configurations of said plurality of graphics pipelines.

17. The method of claim 14 wherein the size of said tiles is configurable.

18. The method of claim 14 wherein the width and height of said tiles are the same.

19. The method of claim 14 wherein the number of said plurality of screen regions is $2^n$.

20. The method of claim 14 further comprising: using a scan converter and a Hierarchical-Z unit to perform a coarse grain tiling process on said tiles.

21. A method for interpolating tiles to a rasterizer comprising:
determining pixel coverage of a plurality of graphics primitives against one or more tiles and minimizing empty tiles by reducing tiles to sub-tiles;
distributing said primitives to one or more pipelines, wherein each of said pipelines is granted ownership to each of said tiles that fall into a designated screen region;
using a rasterizer in each of said pipeline to receive said primitives and perform one or more graphics processing operations on said tiles; and
using a scan converter and a Hierarchical-Z unit to perform a coarse grain tiling process on said tiles, wherein said step of using further comprises:
computing a list of tiles in a current pipeline and covered by a current graphics primitive;
generating a first mask value specifying which of intermediate tiles within each of said tiles on said list are visible;
generating a sub-list containing smaller quad tiles within said intermediate tiles;
computing a second mask value specifying which of said quad tiles are visible and a z plane equation.

22. The method of claim 21 wherein said tiles are of size 8×8.

23. The method of claim 21 wherein said intermediate tiles are of size 4×4.

24. The method of claim 21 wherein said quad tiles are of size 2×2.

25. A method for interpolating tiles to a rasterizer comprising:
determining pixel coverage of a plurality of graphics primitives against one or more tiles and minimizing empty tiles by reducing tiles to sub-tiles;
distributing said primitives to one or more graphic chips, wherein each of said graphics chip is granted ownership to a plurality of said tiles that are contiguous and similar in a designated screen region;
using a plurality of pipelines in each of said graphics chip to receive said primitives, wherein each pipeline performs one or more graphics processing operations on said tiles that are contiguous and similar.

26. The method of claim 25 wherein said distributing uses a super tiling process.

27. The method of claim 25 wherein said graphics processing operations include coarse grain tiling.

28. The method of claim 25 further comprising: storing each of said tiles in a cache in each of said graphics chips.

29. A non-transitory computer usable medium comprising computer readable program code embodied therein configured to cause a computer to:
interpolate tiles to a rasterizer;
determine pixel coverage of a plurality of graphics primitives against one or more tiles and minimizing empty tiles by reducing tiles to sub-tiles;
distribute said primitives to one or more pipelines, wherein each of said pipelines is granted ownership to a plurality of said tiles that are contiguous and similar in a designated screen region;
use a rasterizer in each of said pipeline to receive said primitives and perform one or more graphics processing operations on said tiles that are contiguous and similar.

30. The non-transitory computer useable medium of claim 29 wherein said computer readable code configured to cause a computer to determine uses polygon vertex data in said primitives to calculate pixel coverage.

31. The non-transitory computer useable medium of claim 29 wherein said computer readable code configured to cause a computer to determine dynamically takes into account different configurations of said plurality of graphics pipelines.

32. The non-transitory computer useable medium of claim 29 wherein the size of said tiles is configurable.

33. The non-transitory computer useable medium of claim 29 wherein the width and height of said tiles are the same.

34. The non-transitory computer useable medium of claim 29 wherein the number of said plurality of screen regions is $2^n$.

35. The non-transitory computer useable medium of claim 29 further comprising:
computer readable code configured to cause a computer to use a scan converter and a Hierarchical-Z unit to perform a coarse grain tiling process on said tiles.

36. A non-transitory computer usable medium having computer readable program code embodied therein configured to cause a computer to:
interpolate tiles to a rasterizer;
determine pixel coverage of a plurality of graphics primitives against one or more tiles and minimizing empty tiles by reducing tiles to sub-tiles;
distribute said primitives to one or more pipelines, wherein each of said pipelines is granted ownership to each of said tiles that fall into a designated screen region;
use a rasterizer in each of said pipeline to receive said primitives and perform one or more graphics processing operations on said tiles; and computer readable code configured to cause a computer to use a scan converter and a Hierarchical-Z unit to perform a coarse grain tiling process on said tiles, wherein said computer readable code configured to cause a computer to use further comprises:

computer readable code configured to cause a computer to compute a list of tiles in a current pipeline and covered by a current graphics primitive;

computer readable code configured to cause a computer to generate a first mask value specifying which of intermediate tiles within each of said tiles on said list are visible;

computer readable code configured to cause a computer to generate a sub-list containing smaller quad tiles within said intermediate tiles;

computer readable code configured to cause a computer to compute a second mask value specifying which of said quad tiles are visible and a z plane equation.

37. The non-transitory computer useable medium of claim 36 wherein said tiles are of size 8×8.

38. The non-transitory computer useable medium of claim 36 wherein said intermediate tiles are of size 4×4.

39. The non-transitory computer useable medium of claim 36 wherein said quad tiles are of size 2×2.

40. A non-transitory computer usable medium having computer readable program code embodied therein configured to interpolate tiles to a rasterizer, said computer usable medium comprising:

computer readable code configured to cause a computer to determine pixel coverage of a plurality of graphics primitives against one or more tiles and minimizing empty tiles by reducing tiles to sub-tiles;

computer readable code configured to cause a computer to distribute said primitives to one or more graphic chips, wherein each of said graphics chip is granted ownership to a plurality of said tiles that are contiguous and similar in a designated screen region;

computer readable code configured to cause a computer to use a plurality of pipelines in each of said graphics chip to receive said primitives, wherein each pipeline performs one or more graphics processing operations on said tiles that are contiguous and similar.

41. The non-transitory computer useable medium of claim 40 wherein said computer readable code configured to cause a computer to distribute uses a super tiling process.

42. The non-transitory computer useable medium of claim 40 wherein said graphics processing operations include coarse grain tiling.

43. The non-transitory computer useable medium of claim 40 further comprising: computer readable code configured to cause a computer to storing each of said tiles in a cache in each of said graphics chips.

* * * * *